US011913350B2

United States Patent
Lemonnier et al.

(10) Patent No.: US 11,913,350 B2
(45) Date of Patent: Feb. 27, 2024

(54) INJECTOR FOR A HIGH-PRESSURE TURBINE

(71) Applicant: Safran Aircraft Engines, Paris (FR)

(72) Inventors: Jérôme Claude George Lemonnier, Moissy-Cramayel (FR); Franck Davy Boisnault, Moissy-Cramayel (FR); Nicolas Li Yen Kuhn, Moissy-Cramayel (FR); Antoine Bruno Van Noort, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 35 days.

(21) Appl. No.: 17/767,314

(22) PCT Filed: Oct. 8, 2020

(86) PCT No.: PCT/FR2020/051769
§ 371 (c)(1),
(2) Date: Apr. 7, 2022

(87) PCT Pub. No.: WO2021/069838
PCT Pub. Date: Apr. 15, 2021

(65) Prior Publication Data
US 2022/0364470 A1 Nov. 17, 2022

(30) Foreign Application Priority Data
Oct. 8, 2019 (FR) ........................................ 1911138

(51) Int. Cl.
*F01D 5/08* (2006.01)
*F02C 7/18* (2006.01)
*B22F 10/28* (2021.01)

(52) U.S. Cl.
CPC ............... *F01D 5/082* (2013.01); *B22F 10/28* (2021.01); *F01D 5/081* (2013.01); *F02C 7/18* (2013.01);
(Continued)

(58) Field of Classification Search
CPC ................................. F01D 5/082; F01D 5/081
See application file for complete search history.

(56) References Cited

U.S. PATENT DOCUMENTS

| 6,276,896 | B1 * | 8/2001 | Burge | F04D 29/284 |
| | | | | 415/115 |
| 11,021,962 | B2 * | 6/2021 | Tatman | F01D 5/082 |

(Continued)

FOREIGN PATENT DOCUMENTS

| DE | 10 2007 007 090 A1 | 11/2007 |
| EP | 3 130 753 A1 | 2/2017 |
| EP | 3 228 816 A1 | 10/2017 |

OTHER PUBLICATIONS

International Search Report (PCT/ISA/210) issued in PCT/FR2020/051769 dated Nov. 16, 2020.
(Continued)

*Primary Examiner* — Long T Tran
(74) *Attorney, Agent, or Firm* — BIRCH, STEWART, KOLASCH & BIRCH, LLP

(57) ABSTRACT

The present invention relates to a turbine injector comprising an annular ring extending around a longitudinal axis and having a radially outer edge and a radially inner edge. The crown has a plurality of channels for fluidly connecting the radially outer edge to the radially inner edge, each channel extending in a radial plane of the ring and having an inlet opening near the outer edge and an outlet opening near the radially inner edge, the orientation of each channel varying progressively according to a tangential component between
(Continued)

the inlet section of the inlet opening and the outlet section of the outlet opening.

8 Claims, 3 Drawing Sheets

(52) U.S. Cl.
 CPC .... *F05D 2220/323* (2013.01); *F05D 2260/20* (2013.01)

(56) References Cited

U.S. PATENT DOCUMENTS

| | | | |
|---|---|---|---|
| 2007/0271930 A1 | 11/2007 | Takaoka et al. | |
| 2011/0250057 A1 | 10/2011 | Laureno et al. | |
| 2012/0201654 A1* | 8/2012 | Bouru | F04D 27/0207 |
| | | | 415/116 |
| 2014/0072420 A1 | 3/2014 | Johnson et al. | |
| 2014/0255200 A1* | 9/2014 | Guo | F01D 9/041 |
| | | | 416/236 R |
| 2017/0292393 A1* | 10/2017 | Anastas | F01D 5/082 |
| 2018/0216528 A1* | 8/2018 | Linassier | F01D 25/02 |
| 2019/0323354 A1* | 10/2019 | Plante | F01D 5/045 |

OTHER PUBLICATIONS

Written Opinion (PCT/ISA/237) issued in PCT/FR2020/051769 dated Nov. 16, 2020.

* cited by examiner

INJECTOR FOR A HIGH-PRESSURE TURBINE

FIELD OF THE INVENTION

The present invention relates to the general field of the ventilation of a high-pressure turbine of a twin-spool turbomachine such as an aircraft turbojet engine. More specifically, the invention relates to an injector for a high-pressure turbine.

STATE OF THE ART

A twin-spool turbomachine comprises in particular a high-pressure turbine which is positioned at the outlet of a combustion chamber to recover energy from a stream of combustion gases derived from the combustion chamber and to drive in rotation thanks to this recovery a high-pressure compressor of the turbomachine disposed upstream of the combustion chamber and supplying the latter with pressurized air.

Typically, the high-pressure turbine comprises a rotor disk disposed at the outlet of the combustion chamber and on which are mounted turbine blades driven in rotation by the stream of gases ejected by this combustion chamber.

Due to the high temperatures reached by the combustion gases, the rotor disk and the turbine blades it carries are subjected to significant thermal stresses that can induce expansions. To limit the negative impact of these thermal stresses on the service life of the turbine blades, these are provided with internal cooling circuits which comprise ducts through which ventilation air taken from the bottom of the combustion chamber travels.

This ventilation air is generally brought into an annular cavity by ventilation air injectors distributed circumferentially about the longitudinal axis of the turbomachine. The injectors are connected to an annular bypass space which extends around the combustion chamber, this annular space making it possible to route ventilation air coming from the bottom of the compressor towards the turbine of the turbomachine, the compressor being located upstream of the combustion chamber and supplying the latter with pressurized air for the combustion of the gases. The ventilation air leaving the injectors enters the cavity by passing through orifices formed in a sealing flange disposed upstream of the rotor disk. The cavity communicates with the internal cooling circuits arranged inside the turbine blades. Reference can be made to the publications FR 2,841,591 and FR 2,937,371 which describe examples of such high-pressure turbine architecture.

Generally, the injectors are axial (i.e. the air circulates therein substantially parallel to an axis of rotation of the turbomachine) and consist either of a ring of independent holes inclined at a fixed angle, or of a row of static vanes.

This architecture has the advantage of taking low power from the rotor and not excessively favoring a temperature increase in the turbine.

However, the axial injectors have the drawback of causing poor control of the sealing in the vicinity of the injector and do not guarantee good control of the air flow rate or good distribution of the ventilation.

Consequently, it would be desirable to have a radial injector for guaranteeing control of the air flow rate, while allowing it to be distributed so as to cool the turbine as well as possible.

It is specified that in the present application, a direction substantially parallel to the axis of rotation of the turbomachine is defined as axial direction, and a direction substantially perpendicular to the axial direction (and therefore to the axis of rotation of the turbomachine) is defined as radial direction.

DISCLOSURE OF THE INVENTION

According to a first aspect, the invention proposes a turbine injector comprising an annular ring extending about a longitudinal axis and having a radially external rim and a radially internal rim. Furthermore, the ring has a plurality of channels intended to fluidly connect the radially external rim to the radially internal rim. Each channel extends in a radial plane of the ring and has an inlet opening in the vicinity of the external rim and an outlet opening in the vicinity of the radially internal rim. Each channel presents a gradual variation in its orientation according to a tangential component between the inlet section of the inlet opening and the outlet section of the outlet opening.

In a particularly advantageous manner, the variation in the orientation of the channel, according to a tangential component, allows ensuring a regular acceleration and the gyration of a gas flow in the channel. Thus, this disposition advantageously allows imparting a tangential speed to the cooling air, which, in operation, allows limiting the heating of a turbine rotor disc located opposite the injector. In addition, this disposition allows guaranteeing the control of the air flow rate, while allowing it to be distributed so as to cool the turbine as well as possible.

Each channel can have an outlet section which is mainly oriented tangentially.

For each channel, the variation in the orientation can be monotonic between the inlet section and the outlet section.

For each channel, the outlet section of the channel can be geometrically different from the inlet section of the channel and/or have an area smaller than the area of the inlet section of the channel.

Each inlet section can have substantially the shape of a parallelogram surmounted by a triangle or the shape of a triangle.

Each inlet section can have rounded edges.

Each outlet section can have substantially a parallelogram shape, preferably a rectangle shape.

Each channel can have a wall of constant thickness.

The injector according to the invention can be obtained by additive manufacturing.

According to another aspect, the invention relates to a turbomachine comprising at least one injector according to the invention.

DESCRIPTION OF THE FIGURES

Other characteristics, aims and advantages of the invention will emerge from the following description which is purely illustrative and not limiting and which should be read in relation to the appended drawings in which.

In all the figures, similar elements bear identical references.

DETAILED DESCRIPTION OF THE INVENTION

General Architecture

Figure 1:
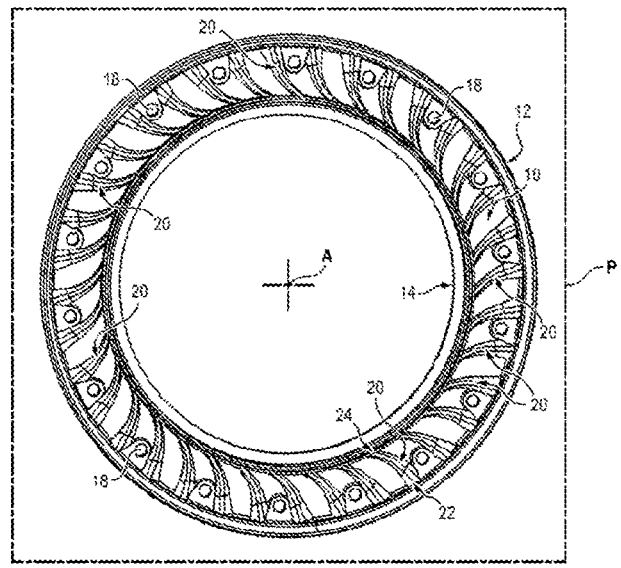
FIG. 1 is a view in a radial plane of an injector according to the invention.
Figure 2:
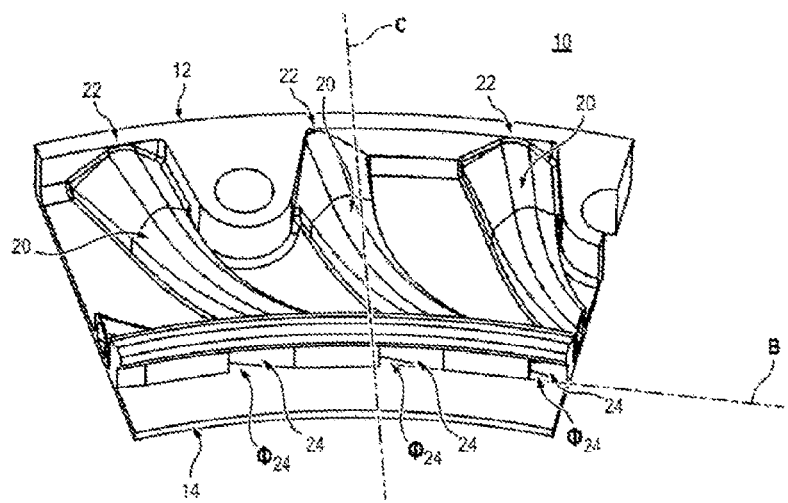
FIG. 2 is a partial perspective view of the channels of an injector according to the invention.
Figure 3:
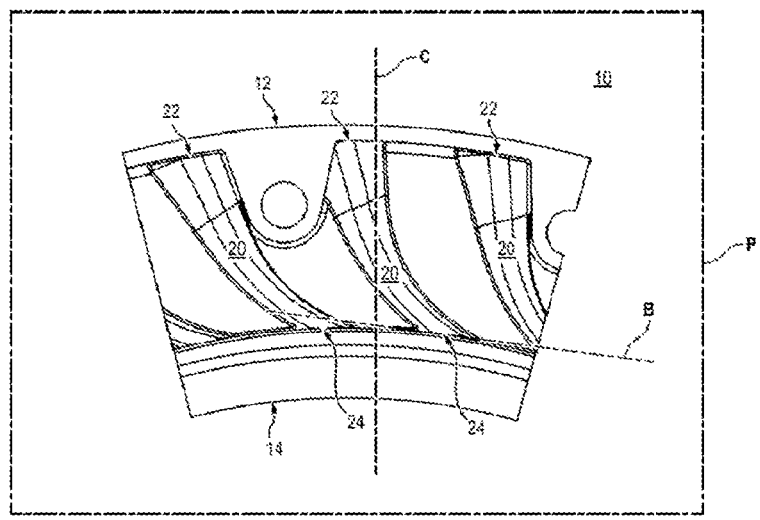
FIG. 3 is a partial view, in a radial plane, of the channels of an injector according to the invention.
Figure 4:
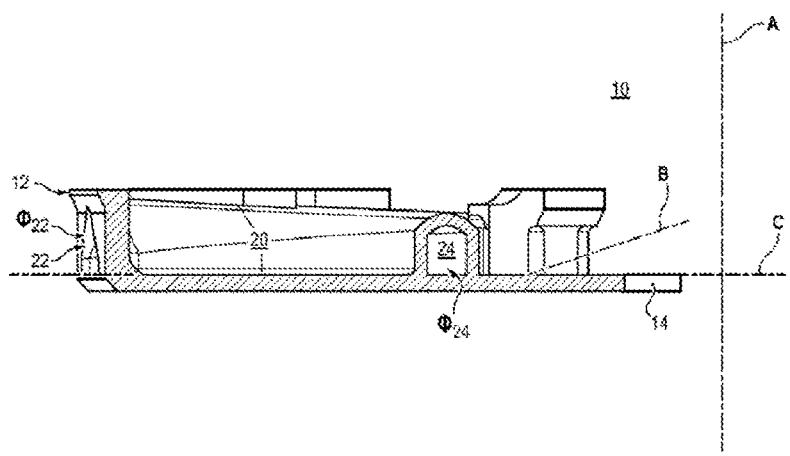
FIG. 4 is a partial view, in cross-section, in a longitudinal plane of channels of an injector according to the invention.
Figure 5:
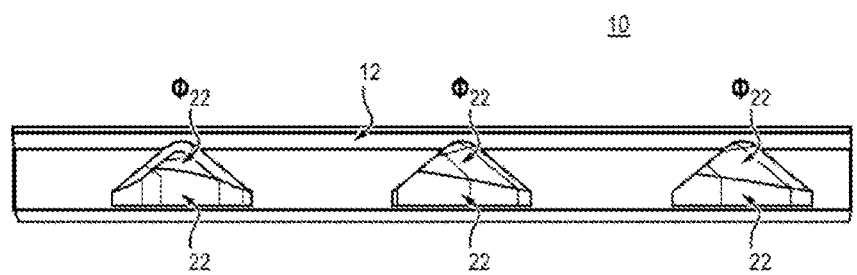
FIG. 5 is a partial view, in a longitudinal plane, of inlet openings of channels of an injector according to the invention.

According to a first aspect, the invention relates to an injector 1 for a high-pressure turbine comprising an annular ring 10 extending about a longitudinal axis A and having an external rim 12 and an internal rim 14. It is specified that in the present document, an axis substantially colinear or at least parallel to the axis of rotation of the turbomachine is defined as longitudinal axis A, and an axis substantially perpendicular to the longitudinal axis A (and therefore to the axis of rotation of the turbomachine) is defined as radial axis C.

The longitudinal axis A is the axis of revolution of the ring 10. Thus, starting from the longitudinal axis A, along a radial direction, the internal rim 14 which is substantially annular will be encountered first, then the external rim 12 which is substantially annular will be encountered next.

The ring 10 has a plurality of channels 20 intended to connect an air circuit coming from a combustion chamber to the cooling and sealing circuits of a turbine.

According to a particularly advantageous disposition, each channel 20 extends in the plane P of the ring 10. It is specified that the plane P of the ring is normal to the longitudinal axis A. Each channel 20 has an inlet opening 22 in the vicinity of the external rim 12 and an outlet opening 24 in the vicinity of the internal rim 14.

In addition, the ring 10 has a series of longitudinal bores 18 (i.e. parallel to longitudinal axis A and perpendicular to plane P). The longitudinal bores 18 allow screwing or riveting the ring 10 in a turbomachine.

Shape and Structure of each Channel

In a particularly advantageous manner, each channel 20 has a gradual variation in its orientation according to a tangential component between the inlet section $\Phi_{22}$ of the inlet opening 22 and the outlet section $\Phi_{24}$ of the outlet opening 24. Preferably, the gradual variation in orientation is monotonic. More specifically, by gradual variation in orientation, it is meant a variation in the orientation of a vector normal to the center of a section of the channel 20 and originating from the center of said section.

Preferably, the outlet section $\Phi_{24}$ is oriented along a non-radial direction. Preferably, the outlet section $\Phi_{24}$ is oriented along a direction having a tangential component B with respect to the longitudinal axis A. It is specified that by tangential component, it is meant a component belonging to the plane P of the ring 10 and substantially tangent to the internal rim 14. It is specified that in the present document, the orientation of a section is evaluated with respect to the orientation of a vector which originates from the center of said section and which is normal to said section.

In addition, in a particularly advantageous manner, the inlet section $\Phi_{22}$ is oriented along a direction having a substantially radial component C with respect to the longitudinal axis A. It is specified that by substantially radial, it is meant that the component C can be inclined by about twenty degrees with respect to a radial axis strictly perpendicular to the longitudinal axis A and belonging to the radial plane P.

In other words, according to these dispositions, the channels are bent with an inlet section $\Phi_{22}$ oriented along a radial component C and an outlet section $\Phi_{24}$ oriented along a tangential component B. As will be detailed below, this curvature and the orientation of the outlet section $\Phi_{24}$ are particularly advantageous dispositions of the invention.

In addition, according to another advantageous disposition, each outlet section $\Phi_{24}$ of each channel is geometrically different from the corresponding inlet section $\Phi_{22}$. Each inlet section $\Phi_{22}$ has an area greater than the area of the corresponding outlet section $\Phi_{24}$. According to a preferred disposition, it will be sought to have the ratio "area of the inlet section $\Phi_{22}$ to area of the outlet section $\Phi_{24}$" as high as possible. Nevertheless, this ratio is limited by the integration constraints in a turbomachine. Also, within the framework of integration into a turbomachine as manufactured by the Applicant, a ratio comprised between 1 and 10 will be privileged.

As will be detailed later, the synergy of the variation in the orientation of the channel 20, according to a tangential component, allows ensuring a regular acceleration and the gyration of a flow of gas in the channel 20. In other words, this disposition allows imparting a tangential speed to the cooling air, which, in operation, allows limiting the heating of a turbine rotor disk located opposite the injector 1.

Figure 6:
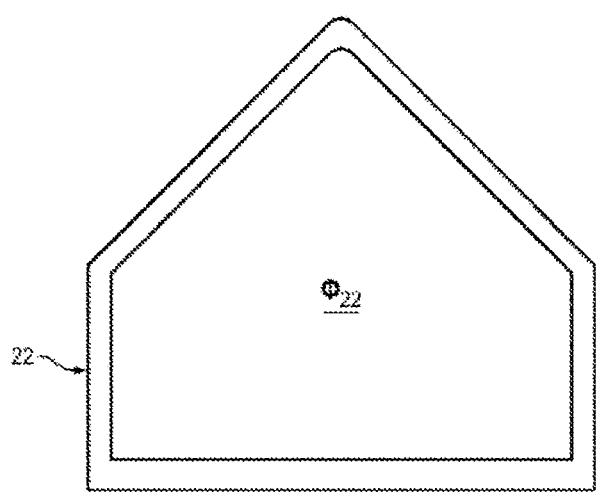
FIG. 6 is a schematic representation of the shape of an inlet section of a channel of an injector according to the invention.

Typically, each inlet section $\Phi_{22}$ can have the shape of a parallelogram surmounted by a triangle, as represented in FIG. 6. According to another disposition, each inlet section $\Phi_{22}$ can have the shape of a triangle. Generally, the triangle shape can have rounded edges. In other words, the edges of the triangle shape can be fillets.

Furthermore, the outlet section $\Phi_{24}$ can have a parallelogram shape. Preferably, the outlet section $\Phi_{24}$ can have a rectangular shape with curved (convex) walls.

Thus, according to one preferred embodiment, the section changes from a rectangle shape surmounted by a triangle to a rectangle shape with curved (convex) walls.

According to one particular disposition, a shell of each channel 20 varies from a shape of the inlet section ($\Phi_{22}$ to a shape of the outlet section $\Phi_{24}$.

Preferably, the shell of each channel 20 has a wall of constant thickness. Nevertheless, according to another embodiment, the shell of each channel 20 can have a wall of variable thickness.

According to one particular disposition, each channel 20 can have a length ranging from 10 to 100 millimeters.

Operation

In operation, a stream of gas enters the inlet opening of each channel 20.

The variation in the section and the curvature of each channel 20 allows accelerating the stream of gas escaping through the outlet opening 24 of each channel 20. This disposition allows maximizing the tangential speed of the air at the outlet of the injector 1. The maximization of the tangential speed of the air at the outlet of the injector 1 is a particularly advantageous disposition of the invention because it allows limiting the heating of the rotor wheel located opposite the injectors. The higher the tangential speed of the air at the outlet of the injector, the more efficient the cooling of the rotor wheel. Preferably, the tangential speed of the air derived from the injectors is substantially equal to the tangential speed of the rotor wheel at the radius where the air from the injectors reaches the rotor wheel located oppositely.

In a particularly advantageous manner, the tangential orientation of the outlet opening 24 of each channel 20 allows having a tangential stream.

In addition, it is notable that preferably, the channels 20 are preferably arranged so that the inlet section $\Phi_{22}$ of each channel is oriented substantially perpendicularly to a main flowpath for the flow of the air in the channel.

More specifically, to fully evaluate the effect of the injector 1, the entrainment coefficient (Ke) which corresponds to the ratio Vti/Vtm can be used, with Vti the tangential speed of the gases at the outlet of the injectors and Vtm the tangential speed of the rotor wheel at the considered radius. The injector 1 according to the invention allows obtaining a relatively high Ke compared to known injectors. Typically, the injector 1 according to the invention allows obtaining a Ke comprised between 1 and 1.5.

Thus, the invention proposes an injector 1 providing a certain flow rate and which accelerates the speed of the gases passing therethrough so that the tangential speed of the gases at the outlet of the channels 20 is substantially equal to the tangential speed of a rotor wheel located oppositely in operation. This allows effectively cooling the rotor wheel thanks to the injection of a cooling stream with a speed having a significant tangential component.

In other words, for a given target flow rate, the injector 1 according to the invention allows providing a high tangential speed thanks to channels 20, which are more compact, easier to manufacture and lighter than the channels of the known injectors.

Manufacturing Method

According to another aspect, the invention relates to a process for the additive manufacturing of the injector 1.

In a known manner, the additive manufacturing process can comprise the superimposition of powder layers melted by an energy source such as a laser or an electron gun.

Turbomachine

According to another aspect, the invention relates to a turbomachine integrating an injector 1.

Aircraft

According to another aspect, the invention relates to an aircraft integrating at least one turbomachine comprising the injector 1.

The invention claimed is:

1. A turbine injector comprising an annular ring extending about a longitudinal axis and having a radially external rim and a radially internal rim, wherein the ring has at least two channels intended to fluidly connect the radially external rim to the radially internal rim, each channel extending in a radial plane of the ring and having an inlet opening in the vicinity of the external rim and an outlet opening in the vicinity of the radially internal rim, each channel presenting a gradual variation in the orientation of the channel according to a tangential component between an inlet section of the inlet opening and an outlet section of the outlet opening, wherein each inlet section has substantially the shape of a parallelogram surmounted by a triangle or the shape of a triangle and wherein the injector is obtained by additive manufacturing.

2. The injector according to claim 1 wherein each channel has an outlet section which is oriented tangentially.

3. The injector according to claim 1, wherein, for each channel, the variation in the orientation is monotonic between the inlet section and the outlet section.

4. The injector according to claim 1, wherein, for each channel, the outlet section of the channel is geometrically different from the inlet section of the channel and/or the outlet section of the channel has an area smaller than the area of the inlet section of the channel.

5. The injector according to claim 4, wherein each inlet section has rounded edges.

6. The injector according to claim 4, wherein each outlet section has substantially a parallelogram shape, preferably a rectangle shape.

7. The injector according to claim 1, wherein each channel has a wall of constant thickness.

8. A turbomachine comprising at least one injector according to claim 1.

\* \* \* \* \*